Nov. 18, 1941.   J. H. KELLER ET AL   2,263,388
FLOW REGULATOR
Filed April 6, 1939   2 Sheets-Sheet 1
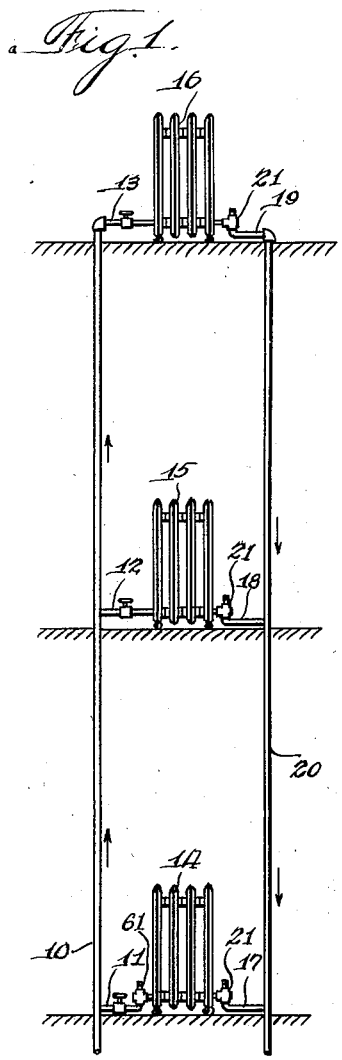
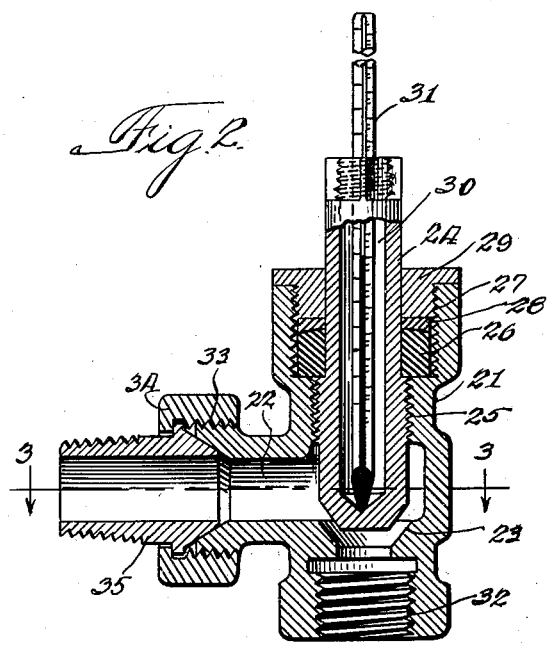
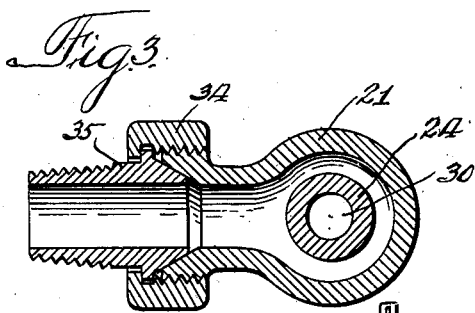
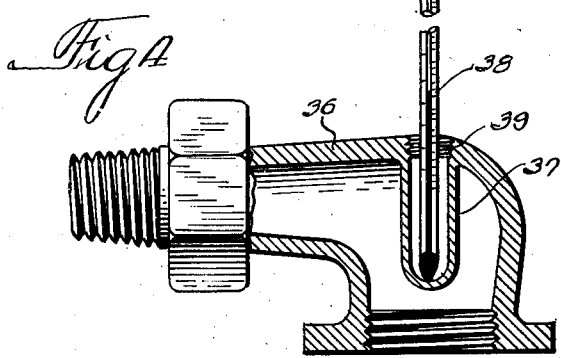
Inventors
Jay H. Keller and
Bryant W. Moore.

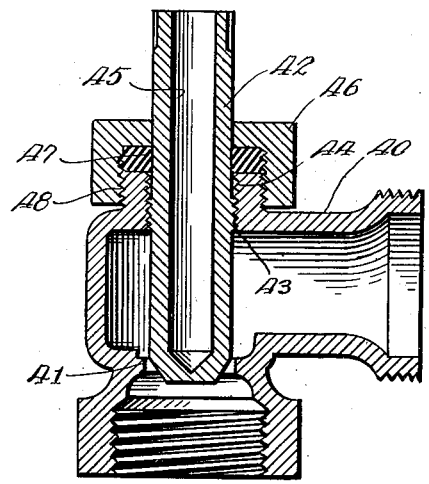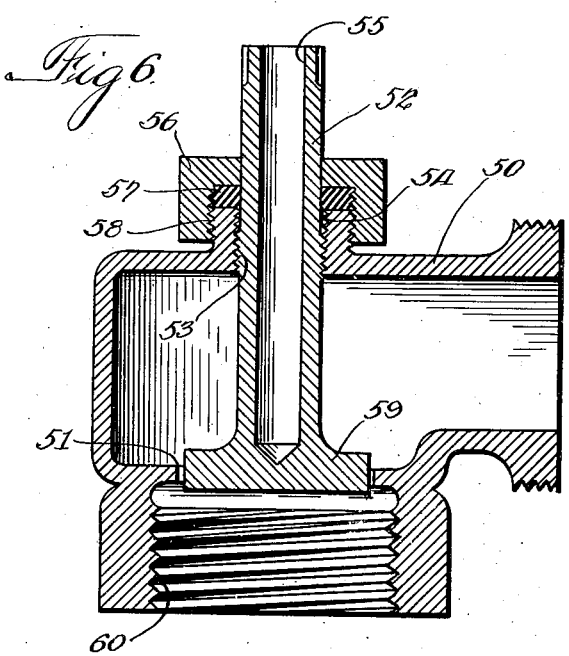

Patented Nov. 18, 1941

2,263,388

UNITED STATES PATENT OFFICE 2,263,388

FLOW REGULATOR

Jay H. Keller and Bryant W. Moore, Portland, Oreg., assignors to Jas. P. Marsh Corporation, Chicago, Ill., a corporation of Illinois Application April 6, 1939, Serial No. 266,250

1 Claim. (Cl. 138—46)

This invention relates to heating systems, more particularly to systems of the type in which hot water or a similar fluid heating medium is supplied from a suitable source to a plurality of radiators or other heat transfer units, and the invention has for an object the provision of an improved heating system of this character.

In the past it has been found that inequalities and discrepancies in the effective heat emitted in various parts of a heating system of the character to which this invention relates, may arise due to inaccurate calculation, improper pipe sizes, or various other causes which may result in one heat transfer unit overheating and another one underheating. Where such a condition exists it is necessary or desirable to balance the system so as to provide a proper heating effect throughout all parts thereof, and various methods have been tried, including the provision of different sized orifices or adjustable valves, for throttling or limiting the flow of the heating medium to certain of the radiators or heat transfer units. Prior to this invention, however, attempts to balance heating systems of this general character have proceeded on what may be termed a trial and error basis and usually take considerable time to work out, sometimes never resulting in an actual balancing of the heating system.

It will be apparent, therefore, that something is yet to be desired in heating systems of this character, and it is a further object of this invention to provide a heating system including means for accurately determining, by measurement, the temperature of the heating medium exhausted from the various heat transfer units, together with means for adjusting the flow of heating medium to each heat transfer unit independently of the other heat transfer units, so as properly to balance the effective heating of all or a part of a system.

In carrying out the invention in one form, a heating system is provided including a source for supplying fluid heating medium to a plurality of heat transfer units which may be positioned at different distances from the source and which may be of different sizes, and each heating unit is provided with adjustable means for controlling the flow of heating medium therethrough independent of the other heat transfer units, and with means for effecting accurate measurement of the temperature of the heating medium exhausted from each heat transfer unit. In order to balance the heating system, the adjustable control means may be operated to regulate the flow of heating medium through each particular heat transfer unit so that the temperature of the heating medium leaving all of the heat transfer units, as indicated by the temperature measuring means, is approximately the same regardless of the distance of that particular heat transfer unit from that source of heat. If the radiation has initially been accurately calculated, such a balancing of the exhaust temperature of the heating medium will result in uniform heating of the occupied quarters. On the other hand, if the heat transfer units are undersize or oversize in given locations, improper heating may be overcome by increasing or decreasing the flow of heating medium through certain heat transfer units so as to raise or lower the temperature of the heating medium at the return or exhaust side of the heat transfer unit.

Although the control means for regulating the flow of water through the heat transfer units may be placed either in the inlet or in the outlet lines of the heat transfer unit, in the preferred form of the invention the adjusting means and the temperature indicating arrangement are combined into one fitting or device adapted to be placed in the return line of the heat transfer unit.

For a more complete understanding of this invention, reference should now be had to the drawings, in which:

Fig. 1 is a somewhat diagrammatic view of a heating system embodying the invention;

Fig. 2 is a sectional elevational view of a preferred form of fitting shown generally in Fig. 1 and adapted to be utilized in carrying out the present invention;

Fig. 3 is a sectional view taken along the line 3—3 of Fig. 2;

Fig. 4 is a sectional view partly in elevation, illustrating another type of fitting or device adapted to be used in a heating system such as that shown in Fig. 1 in carrying out the present invention; and Figs. 5 and 6 are similar views illustrating further forms of fittings adapted for use in carrying out the invention.

Referring now to the drawings, the invention is shown somewhat diagrammatically in Fig. 1 as embodied in a heating system in which a fluid heating medium such as hot water is supplied from a suitable source (not shown) through a supply conduit 10, connected by a plurality of branch pipes 11, 12, and 13 to conventional radiators or heat transfer units 14, 15, and 16, each of the radiators also being connected by branch conduits 17, 18, and 19 to a return conduit 20 which is likewise connected to the source from which the hot water or similar heating fluid is supplied.

Systems of the general type shown in Fig. 1 are, of course, well known in the art, and it will be understood that, in operation, hot water flows from the source through the inlet conduit 10 and the branch conduits 11, 12, and 13 to the various heat transfer units and, after flowing therethrough, is exhausted through the branch conduits 17, 18, and 19 to the return conduit 20, through which it flows to the source of heat for reheating and recirculation. Since the radiators or heat transfer units 14, 15, and 16 are located at different distances from the source of heat medium and since various sizes of pipe may be used in connecting up these radiators with the source of heating medium, it will be apparent that the flow of heating medium through the various heating transfer units may differ considerably and, accordingly, the heat emission from the various heat transfer units may not be of the proper magnitude.

In order to insure that the system may be accurately and quickly balanced, there is provided in each of the branch conduits 17, 18, and 19, leading from the exhaust sides of the heat transfer units, a fitting 21 of the type shown in Figs. 2 and 3.

As shown in Figs. 2 and 3, the fitting 21 is provided with a passageway 22 in which is disposed a valve seat 23 adapted to co-operate with an adjustable valve 24 which includes a threaded portion 25 adapted to engage suitable internal threads on a portion of the fitting 21. It will be apparent that, when the adjustable member 24 is rotated with respect to the fitting 21, the inner end of the member 24 approaches or recedes from the valve seat 23 so as to control the flow of heating medium through the passageway 22 and, in order effectively to seal the passageway 22 and the adjustable member 24 against the escape of heating medium, there is provided a packing member 26 which surrounds the adjustable member 24 and is disposed in an enlarged threaded aperture 27 in the fitting 21, which also is adapted to receive a suitable metal washer 28 and a sealing nut 29. It will be apparent that, when the nut 29 is tightened in the threaded aperture 27, the packing member 26 is compressed so as tightly to seal the adjustable member 24 against the escape of heating medium while at the same time permitting rotation of the adjustable member 24 with respect to the fitting 21.

As shown, the adjustable member 24 is shaped so as to provide a well or aperture 30 which extends substantially throughout the length of the member 24, being closed at the inner end and open at the outer end to permit insertion of a thermometer 31 therein. The lower end of the adjustable member 24 extends, as shown, into the path of the heating medium flowing through the passageway 22 and the adjustable valve formed by the seat 23 and the member 24. Accordingly, when the thermometer 31 is positioned in the aperture or well 30, as shown in Fig. 2, the thermometer is in heat exchanging relation with the heating medium and therefore is effective to indicate the temperature thereof.

The fitting 21 is provided with an internally threaded portion 32 at one end of the passage 22, whereby the fitting may be connected to a pipe or conduit such as the branch conduits 17, 18, and 19, and the portion of the fitting 21 forming the opposite end of the passageway 22 is provided with external threads 33 for receiving a sealing nut 34 and a connector 35 which is threaded for engagement with corresponding threads formed on the exhaust side or outlet of a heat transfer unit, such as the radiator units 14, 15, and 16.

It will be apparent that the fittings 21 may be applied to a heating system of the type shown in Fig. 1 when the system is initially installed or, if desired, may readily be applied to previously installed systems simply by cutting the return line adjacent each heat transfer unit and connecting the fitting therein, as shown in Fig. 1. In order properly to balance the heating system provided with the fittings 21, it is only necessary for the service man to insert a thermometer, such as the thermometer 31, into the well or aperture 30 in the adjustable member 24 so as to obtain an indication of the temperature of the heating medium exhausted from the heat transfer unit, and then to adjust the member 24 so as to increase or decrease the rate of flow of the heating medium through the passageway 22 until a proper temperature of the heating medium flowing through the passageway 22 is obtained. It will, of course, be understood from the above description that adjustment of the member 24 so as to increase the rate of flow of the heating medium through the heat transfer unit is effective to increase the heat emission at the exhaust side of the heat transfer unit, and, correspondingly, adjustment of the member 24 so as to decrease the rate of flow is effective to decrease the heat emission from the heat transfer unit.

Since the temperature measuring means, such as the thermometer 31, gives an accurate indication of the temperature of the heating medium and since the desired exhaust temperature necessary to obtain the proper degree of heat emission from the heat transfer unit may be accurately calculated from the temperature of the heating medium supplied and the size of the unit, it becomes a simple matter through use of the fittings 21 to balance an entire heating system so as to obtain the proper degree of heat emission from each radiator or heat transfer unit thereof. Preferably, the upper end of the adjustable member 24 is square or hexagonal, as indicated in Fig. 2, so that a wrench may be easily applied thereto in order to accomplish the desired adjustment, and the upper end of the adjustable member 24 is also preferably provided with internal threads adapted to receive a plug so that the well or aperture 30 may be closed after the proper adjustment has been made and the thermometer 31 removed. Thus, accumulation of dirt and foreign matter in the well of the thermometer 30 is prevented.

As heretofore indicated, the flow of heating medium through the individual radiators or heat transfer units may, in accordance with this invention, be controlled by any desired type of valve or adjustable means located either in the supply conduit or in the return conduits leading to or from the radiator. Therefore, in place of the fitting 21 shown in Figs. 2 and 3, any suitable valve means may be employed, either in the supply conduit or in the return line of the radiator, in conjunction with a fitting of the type shown in Fig. 4. The fitting 36 shown in Fig. 4 consists simply of an elbow adapted to be connected in the return line of a heat transfer unit or radiator in substantially the same fashion as the fittings 21 heretofore described and includes a thermometer-receiving aperture or well 37 which extends into the path of the heating medium flowing through the elbow 36, so that a thermometer, such for example as the thermometer 38, when disposed in the well or aperture 37 is effective to indicate the temperature of the heating medium flowing from the radiator or heat transfer unit to which the elbow 36 is connected. Preferably, the upper end of the aperture or well 37 is threaded, as indicated by the reference numeral 39, to receive a closure plug which may be applied after the thermometer 38 has been removed in order to prevent the accumulation of dirt within the well 37.

The fittings 40 and 50, respectively shown in Figs. 5 and 6, are in general similar to the fittings 21 of Figs. 2 and 3, and are adapted to be connected in substantially the same manner in the exhaust line of a radiator or heat transfer unit, as described in connection with Fig. 1. These fittings 40 and 50, however, are somewhat simpler in construction than the fitting 21 and are so constructed that certain standard size sealing members may be utilized on large or small valves of considerably different capacities.

As shown, the fitting 40 includes a valve seat 41 adapted to co-operate with an adjustable member 42 which is provided with a threaded portion 43 for engaging a correspondingly threaded aperture 44 in one wall of the fitting 40. A suitable thermometer well 45 extends substantially throughout the length of the adjustable member 42, so that when a thermometer, such for example as the thermometer 31 of Fig. 2, is placed therein the thermometer will be supported in the path of the heating medium flowing through the fitting 40. In order to prevent the escape of heating medium while at the same time permitting rotation of the adjustable member 42 with respect to the fitting 40, a sealing member 46 is provided adapted to contain a deformable sealing washer 47 therewithin, the sealing member being provided with internal threads, as shown, for co-operatively engaging suitable external threads 48 on one wall of the fitting 40.

Inasmuch as the purpose of the adjustable valve means in the fitting 40 is to control within predetermined limits the rate of flow of heating fluid therethrough, it is not necessary that the valve constitute a complete shut-off such as is provided by the adjustable valve means of the fitting 21 and, accordingly, the adjustable member 42 and the valve seat 41 may be arranged as shown so as to constitute simply a throttling valve for the heating medium.

The fitting 50 shown in Fig. 6 is in many respects similar to the fitting 40 of Fig. 5, but is larger in size and is adapted for use in connection with large capacity heating systems. Accordingly, the adjustable valve member 52 is provided with an enlarged head 59 at its lower end, as shown, which enlarged head co-operates with a correspondingly large valve seat 51 in the fitting 50. In the construction shown an appreciable clearance is provided between the enlarged head 59 and the valve seat 51, and if desired the head may be arranged to fit rather closely within the seat although a sealing fit is not necessary. In order that standard sealing members may be utilized with either the fitting 50 or the fitting 40, the stem portion of the adjustable member 52 is formed with the same external diameter as the member 42 of Fig. 5 and is provided with a threaded portion 53 adapted to co-operate with a correspondingly threaded portion 54, utilizing the same standard thread as is used on the portion 44 of Fig. 5. With such an arrangement it will be apparent that the sealing member 56 and the sealing washer 57 may be identical with the members 46 and 47 of Fig. 5, the threaded portion 58 on the fitting 50 being identical with the threaded portion 48 on the fitting 40.

As shown, the fitting 50 is provided with a large outlet passage 60 so as to permit the adjustable member 52 to be inserted from the bottom of the fitting 50 to a position in which the threads 53 on the fitting co-operatively engage the threaded portion 54 of the fitting. It will, of course, be understood that the fitting 50 is adapted to be utilized in the same fashion and for the same purposes as the fittings 21 and 40, and accordingly the adjustable member 52 is provided with a suitable thermometer well 55 for receiving an indicating thermometer. As illustrated in Figs. 5 and 6, the adjustable members 42 and 52, respectively, are provided with square or hexagonal upper ends so as to permit the engagement of a suitable tool therewith for adjusting purposes, and, if desired, the members 42 and 52 may be internally threaded, as explained in connection with Fig. 2, so as to receive a closure plug and thus prevent the accumulation of dirt therein after the proper adjustment has been made and the thermometer removed from the thermometer well.

It will now be apparent that, with any of the fittings 21, 40, and 50, or with the fitting 36, which latter fitting is used in conjunction with a separate adjustable valve, a thermometer or similar means for indicating the temperature of the heating medium is located at the exhaust side of the heat transfer unit or radiator, so as to measure the temperature of the heating medium at this point. This is an important feature of the present invention, since, with a given temperature of the heating medium at the source of heat, the temperature of the heating medium at the discharge end of the radiator is a measure of the degree of heat emissivity of the radiator. Measurement of the temperature of the heating medium at this point, therefore, provides an accurate and easily obtained determination, in accordance with which the heating system may be efficiently balanced through the adjustment of suitable valve means regulating the flow of heating medium through the individual heat transfer units.

In some instances it may be desirable to control both the supply and the exhaust of heating medium at individual heat transfer units. This may be accomplished in accordance with the present invention by providing the heat transfer units with temperature measuring and flow controlling means of the type heretofore described, such means being provided at both the supply and exhaust sides of the unit in order more accurately to control the heat emission. Thus in Fig. 1 the heat transfer unit 14 is shown as provided with a fitting 61 at its inlet side in addition to the fitting 21 at its exhaust side. This fitting 61 may correspond to any of the heretofore described means for measuring the temperature and controlling the flow of the heating medium, and by properly adjusting the devices 21 and 61 so as to maintain desired temperatures at the supply and exhaust sides of the heat transfer unit 14, very accurate control of the heat emission therefrom is obtained.

While we have shown particular embodiments of our invention, it will be understood, of course, that we do not wish to be limited thereto since many modifications may be made, and we, therefore, contemplate by the appended claim to cover any such modifications as fall within the true spirit and scope of our invention.

Having thus described our invention, what we claim and desire to secure by Letters Patent is:

A regulating device for controlling the flow of a heating medium through a heat transfer unit, comprising an elbow-shaped fitting having inlet and outlet ends connected by a passageway, one wall of said passageway having a threaded aperture in alignment with one of said ends, a valve port in said passageway intermediate said aperture and said one end and in alignment therewith, a valve member including a hollow valve stem threaded for engagement with said threaded aperture, said valve member also including a portion adapted to cooperate with said valve port to control the flow of heating medium therethrough, said valve port being at least as large as said aperture and slightly larger than said cooperating portion of said valve member whereby said valve member may initially be assembled and threaded into said aperture by insertion through said valve port from said one end of said fitting, said hollow valve stem after assembly being disposed in the path of the heating medium in said passageway and providing a thermometer well in heat exchanging relation with said heating medium, and means providing a fluid-tight seal between said valve stem and said fitting after assembly of said stem in said aperture, said sealing means permitting rotation of said valve stem to adjust said valve member relative to said valve port and control the flow of heating medium in accordance with the indications of a temperature measuring instrument disposed in said thermometer well.

JAY H. KELLER.
BRYANT W. MOORE.